Jan. 12, 1932.  F. A. LEIGH  1,840,516
FILTERING DEVICE
Filed March 14, 1930
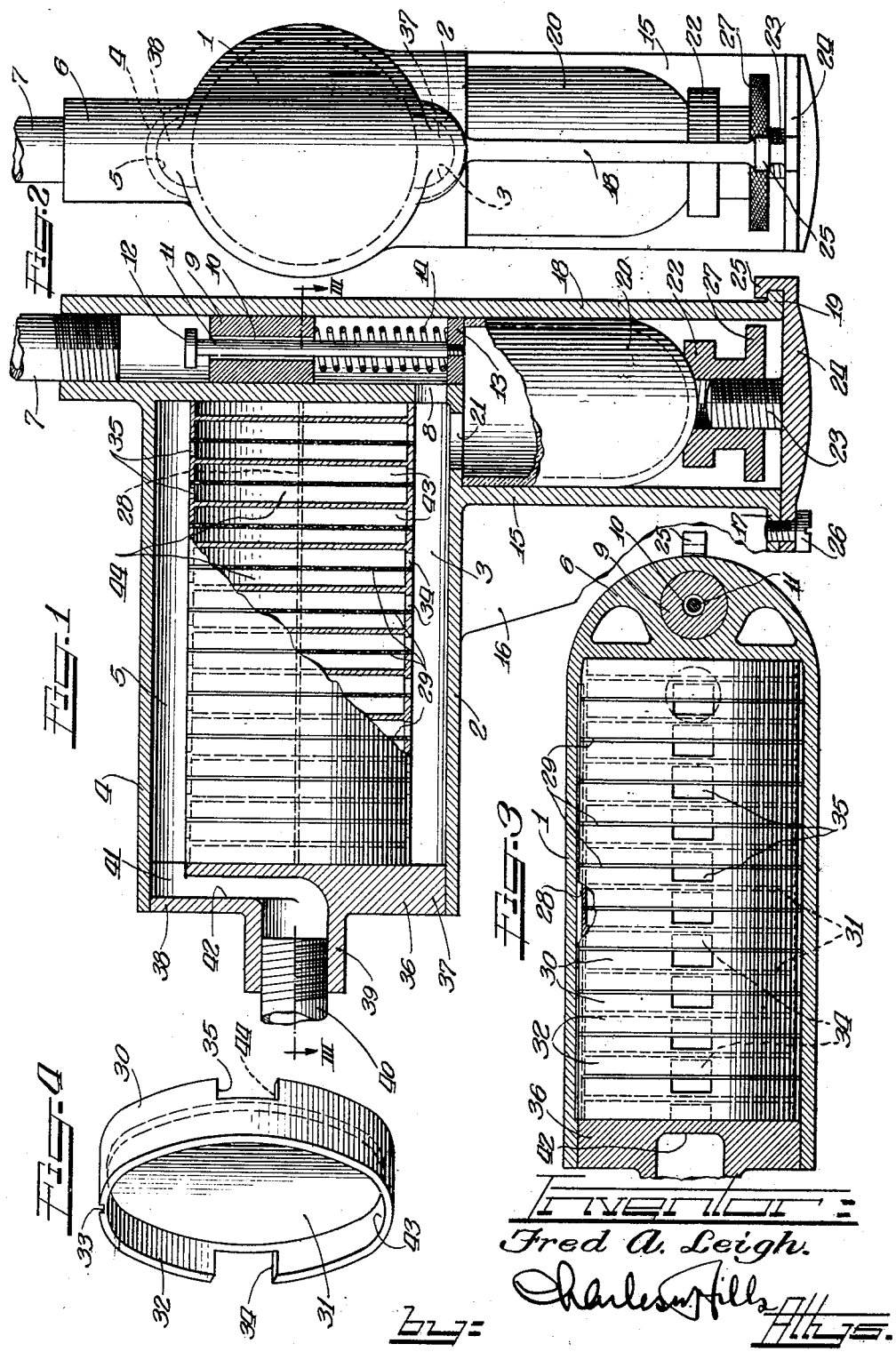
Inventor:
Fred A. Leigh.
by Charles W. Hills
Attys.

Patented Jan. 12, 1932

1,840,516

UNITED STATES PATENT OFFICE

FRED A. LEIGH, OF CHICAGO, ILLINOIS, ASSIGNOR OF ONE-FOURTH TO WALTER H. NELSON, OF CHICAGO, ILLINOIS

FILTERING DEVICE

Application filed March 14, 1930. Serial No. 435,721.

This invention relates to an improved type of filtering device, and more particularly to a filtering device adapted for the filtering of gases or liquids which are adapted to be passed through an intake pipe connected at one end of a casing in which a plurality of screens are mounted in spaced relation separated from one another by means of a plurality of ring units having diagonally opposite apertures or openings therein, with said units so aligned with one another that the openings in said units are adapted to communicate with a common intake passage and a common outlet passage, whereby a filter is produced wherein the filtering areas are materially increased and wherein the screens and the separators are arranged to provide a plurality of parallel filtering passages or circuits permitting a liquid or gas to be rapidly filtered through the filtering housing in which the screens and separators are mounted in a readily accessible position, permitting as many screens and separators to be used as desired.

It is an object of this invention to provide an improved type of filtering device wherein a casing, provided with a valve-controlled intake passage and an outlet passage, is adapted to be equipped with a filtering unit embracing a plurality of screens separated by flanged separators arranged with solid plates or partitions and having diagonally opposite apertures in the flanges thereof, permitting a plurality of parallel filtering circuits to be established in the housing for the rapid filtering of gases or liquids.

It is also an object of this invention to provide an improved type of simplified filtering device wherein a casing or housing is provided with a common intake passage and a common outlet passage between which a plurality of parallel, separated screens are arranged, with said screens separated by means of solid discs having integral flanges projecting from opposite sides thereof and provided with diagonally opposite openings on opposite sides of said discs whereby a gas or liquid entering the common intake passage is adapted to pass through the intake aperture of the flange of one separator to then pass through a filtering screen into a chamber of an adjacent separator and out of the outlet aperture in the flange thereof to escape through the common outlet passage provided in the casing or housing.

It is furthermore an object of this invention to provide an improved, simplified and inexpensive type of filter embracing a passaged casing having a plurality of parallel screens arranged therein and separated by means of a plurality of units, each of which embraces a solid plate having a peripheral flange extending beyond both surfaces of the plate, said flange having an opening provided therein on each side of the plate to permit a quantity of the material to be filtered to enter a chamber between the plate of one unit and a filtering screen, allowing the material to filter through the screen into a chamber in an adjacent unit, from which the filtered material is adapted to escape through a common outlet passage provide in the housing of the device.

It is an important object of this invention to provide an improved, simplified and inexpensive form of gas or liquid filtering device embracing a passaged housing arranged to receive a plurality of removable screens separated by means of separating units which are so constructed that a plurality of parallel filtering passages are provided between a common intake passage and a common outlet passage provided in the housing and connected by the various parallel filtering passages.

Other and further important objects of this invention will be apparent from the disclosures in the specification and the accompanying drawings.

The invention (in a preferred form) is illustrated in the drawings and hereinafter more fully described.

On the drawings:

Figure 1 illustrates a fragmentary longitudinal central section of an improved form of filtering device embodying the principles of this invention and showing parts in elevation and with parts broken away.

Figure 2 is an end elevation of the filtering device.

Figure 3 illustrates a fragmentary longitudinal section taken on line III—III of Figure 1, with parts broken away to show the construction of the separating units.

Figure 4 is an enlarged perspective view of one of the separating units removed from the housing.

As shown on the drawings:

The improved filtering device comprises a casing or housing 1 which is closed at one end and open at the opposite end. The casing 1 is of cylindrical shape and has integrally formed longitudinally along the bottom thereof a channel or bead 2 provided with an intake or supply passage 3 which communicates with the chamber within the housing 1 throughout its entire length. Also integrally formed on the opposite side or top of the cylindrical casing or housing 1 is an outlet channel or bead 4 having a common outlet or discharge passage 5 provided therein extending throughout the entire length of the housing.

Integrally formed on the closed end of the casing or housing 1 is a valve casing or intake tube 6. The intake tube or auxiliary housing 6 extends diametrically across the closed end of the housing 1 and has engaged in the upper end thereof one end of a gas or liquid supply pipe 7.

Provided in one side of the lower end of the auxiliary casing or tube 6 is an outlet opening or aperture 8 which connects the interior of the auxiliary casing or tube 6 with the passage 3 in the main housing channel 2. Secured in the auxiliary casing 6 is a guide sleeve 9 provided with a passage 10 through which a valve stem 11 slidably projects. Secured on the upper end of the valve stem 11 is a valve 12 adapted to control the admission of a liquid or gas into the passage 10 of the guide sleeve 9. Secured on the lower end of the valve stem 11 is an auxiliary valve 13 which is adapted to control the passage of a liquid or a gas from the interior of the auxiliary casing or tube 6 through the outlet opening 8 into the passage 3. Engaged around the valve stem 11 between the lower end of the guide sleeve 9 and the auxiliary valve 13 is a coiled control spring 14.

Integrally formed on the bottom of the housing 1 is a bracket plate 15 which is reenforced by means of a web or flange 16. Integrally formed on the lower end of the bracket plate 15 is a flange 17 which is provided with a threaded aperture. Integrally formed on the closed end of the housing 1 is a downwardly projecting rib or bar 18 which projects downwardly and is provided with a flange or toe 19 at the lower end thereof. Normally, the control spring 14, acting on the lower or auxiliary valve 13, holds the valve 13 in its lowermost position and causes the main or upper valve 12 to seat against the upper end of the guide sleeve 9 to close the intake passage 10.

For the purpose of receiving sediment or the like from the material which is being filtered, a cup or pot 20 is engaged between the bracket plate 15 and the guide bar 18, with the open upper end of the cup 20 seating against the bottom of the housing 2 around an aperture or opening 21 provided in the bottom of the housing 1, as clearly illustrated in Figure 1. The upper end of the cup 20 affords a stop for the lower or auxiliary valve 13 and holds the same in elevated position similar to that illustrated in Figure 1, below the opening 8, thereby causing the upper or main valve 12 to be raised out of contact with the upper end of the guide sleeve 9 to permit a liquid or gas, to be filtered, to flow downwardly from the supply pipe 7 through the tube 6 to enter the housing 2 by way of the opening 8. The lower end of the cup 20 is rounded and closed and seats against the concave upper end of an adjustable head or nut 22 which is provided with an axial threaded passage to permit the same to be adjustably threaded upon a screw bolt 23 which is integrally formed on a cap or plate 24 which is held locked in contact against the flanges 17 and 19 by means of a hook member 25 which is integrally formed on the cap or plate 24 and which hooks over the flange 19 on the lower end of the rod 18. A retaining screw 26 is threaded through an aperture in the plate 24 and engages in the threaded aperture in the flange 17 to lock the plate 20 in position. The supporting head 22 is provided with a knurled flange 27 to permit the head 22 to be raised or lowered on the screw stem 23 to rigidly hold the cup or pot 20 secured in position with the upper end of the cup tightly seated against the housing 1.

A liquid or gas entering the passage 3 by way of the opening 8 is permitted to pass through the opening 21 into the chamber provided within the cup 20, thereby permitting the sediment or other foreign particles in the liquid or gas to be deposited in the cup 20 to permit easy removal of the same when the filter requires cleaning.

The inner surface of the side portion of the housing 1 is provided with a key slot having a key 28 engaged therein and projecting into the interior of the housing 1. The key 28 extends from substantially the inner end of the housing to within a short distance of the outer open end thereof, as clearly illustrated in Figure 3, and it is provided for the purpose of affording a suitable guide for the purpose of aligning a plurality of filtering units within the housing in stacked, abutting relation.

The filtering device contained within the housing 1 comprises a plurality of filtering screens 29 which are mounted in spaced parallel relation and are separated by means of a plurality of spacers or separators, each of which comprises a rim or band which is integrally formed around a solid disc or plate 31 positioned half way between the edges of the rim to divide the rim into a flange 30 on one side of the plate 31 and a flange 32 on the opposite side. The two flanges 30 and 32, which form the rim of a separator unit are provided with a longitudinal groove or key slot 33 adapted to be slidably engaged on the guide key 28 to position the separator units in proper alignment. The key slots 33 provided in the separator units permit the separator units to be engaged in the housing 1 in a predetermined position separating the screens 29 and positioning the separator units so that an intake notch or opening 34 in the flange 32 is adapted to be positioned to communicate with the common passage 3, while an outlet notch or opening 35 in the flange 30 of each of the separator units is adapted to be positioned to communicate with the common outlet passage 5 of the housing 1. With the provision of the guide key 28 and the slots 33 provided in the separator units, the various units may be properly engaged in position in the housing 1 with the intake openings 34 of the separator units all communicating with the passage 3, while the outlet openings 35 of said separator units are all adapted to communicate with the outlet passage 5 of the casing 1. The separator units separate the screens 29 and hold the same clamped therebetween in stacked relation within the interior of the housing 1 and are held in such contacting relation by means of a header or closure plate 36 which is tightly forced into the outer end of the housing 1 and is provided with diametrically opposite ears or extensions 37 and 38 which are adapted to be engaged in the ends of the passaged beads 2 and 4, respectively.

The header 36 is provided with an outlet sleeve 39 in which one end of an outlet tube or pipe 40 is engaged. The ear or extension 38 of the header is provided with a passage 41, the outer end of which communicates with the outer end of the outlet passage 5, while the inner end communicates with the passage in the collar or sleeve 39 by means of a radial passage 42 provided in the header 36, as clearly illustrated in Figure 1.

The operation is as follows:

With the improved filtering device assembled as illustrated in Figure 1, the main control valve 12 is held in open position and the lower or auxiliary valve 13 is held seated in an opening in the lower end of the tube 6. This positioning of the valves 12 and 13 permits a liquid or gas entering the supply pipe 7 to pass through the tube 6 and the passage 10 downwardly out through the outlet opening 8 into the common feed passage 3 provided in the lower channel or bead 2 of the housing 1. The liquid or gas to be filtered is adapted to flow down and fill the cup or pot 20 which affords an arrangement permitting any sediment or foreign material in the material to be filtered to be deposited in the bottom of said cup or pot. The material to be filtered which passes into the feed passage 3 is permitted to pass upwardly through the various inlet openings or notches 34 of the separator units to enter the intake chambers 43 provided between the front sides of the separator plates or discs 31 and the screens 29. From the intake chambers of the separator units, the liquid or gas to be filtered passes through the respective screens 29 into the outlet chambers 44 provided between the rear faces of the discs or plates 31 and the front surfaces of the respective screens 29. From the outlet chambers 44 of the separators, the liquid or gas which has been filtered by passing through the screens 29 is permitted to escape through the outlet notches or openings 35 into the common outlet passage 5 provided in the channel or bead 4.

From the channel outlet passage 5, the filtered liquid or gas passes through the opening 41 and the passage 42 through the collar 39 and out through the outlet pipe 40 to be delivered to a carburetor or receiving tank connected with the outer end of the pipe 40.

The liquid or gas entering the feed pipe 7 and passing through the tube 6 into the common feed passage 3 is permitted to pass through the housing 1 through a plurality of parallel filtering passages provided between the passages 3 and 5 by the chambers formed on opposite sides of the solid plates 31 forming part of the separator units which separate the screens 29. The large number of filtering screens adapted to be used in this construction permits a rapid and thorough filtering of the liquid or gas.

It will be noted that the liquid or gas from the common passage 3 is permitted to enter an intake chamber 43 of one separator unit and is then permitted to escape through the screen 29 adjacent thereto into the outlet chamber 44 of an adjacent separator unit, from which the filtered material is adapted to flow through the respective outlet openings 35 into the common outlet passage 5.

The novel construction of the flanged separator units permits said units and the respective screens to be readily removed from the interior of the housing 1 when the header 36 is removed, so that the screens and separator units may be readily cleaned and reinstalled in position with the intake and outlet openings 34 and 35 of said units properly communicating with the respective passages 3 and 5 of the channel members 2 and 4 forming part of the housing 1.

It will be noted that the parallel branches of the fluid must travel along fluid paths of substantially equal length, and that the duty on the filtering screens will, therefore, be substantially equal.

It will also be noted that when the sediment cup 20 is in its normal position its inlet is restricted to that of the opening 21 communicating at one side of the top of the cup so that sediment may drop into a zone not directly in the path of the main body of the fluid. However, when the cup is lowered, the auxiliary valve 13 is opened to increase communication between the cup and the casing so that the casing may be properly drained. When the cup is lowered, the spring 41 closes the inlet valve 12. Fluid pressure may now be applied at the outlet sleeve 39 to blow sediment from off the filtering screens and out through the opening 21 and the auxiliary valve 13.

It will, of course, be understood that various details of construction may be varied through a wide range without departing from the principles of this invention, and it is, therefore, not purposed to limit the patent granted hereon otherwise than necessitated by the scope of the appended claims.

I claim as my invention:

1. A filtering device, comprising an elongated casing substantially closed at each end and having an inlet at one end of the casing and an outlet at the other end, filtering means in said casing, means defining an inlet passage in the casing extending between the ends thereof, an inlet tube for said casing in communication with said inlet passage, a sediment cup removably secured to the casing adjacent the inlet end thereof, the said casing and the said inlet tube being each apertured to afford communication between the cup and the casing and inlet tube, and valve means in the intake tube arranged movable with said cup to stop the flow of fluid into the casing while simultaneously increasing communication between said cup and said casing.

2. A filtering device, comprising an elongated casing substantially closed at each end and having spaced apart and substantially coextensive inlet and outlet passages formed therein communicating with an outlet at one end of the casing and an inlet at the other end of the casing, a plurality of filtering mediums positioned communicating between said inlet and outlet passages providing a plurality of parallel paths for fluid flow, an intake tube positioned normal to said inlet passage and communicating therewith, a sediment cup with its open end arranged communicating with said inlet passage near the inlet and with said inlet tube, a pair of valves connected for simultaneous movement positioned in said intake tube, spring means arranged normally urging one of said valves to closed position and the other to open position, and means arranged movably supporting said sediment cup in engagement with one of said valves to retain it in closed position.

3. A filtering device, comprising an elongated casing having an integrally formed end member substantially closing one end, an insertible plug member substantially closing the other end of the casing, an outlet formed in said plug member and an inlet formed in said integrally formed member, spaced apart and substantially coextensive inlet and outlet passages formed in said casing and communicating with the inlet and outlet, respectively, means defining a plurality of chambers positioned engaging said end members and being apertured to provide a plurality of paths for fluid flow between the inlet and outlet passages, screens in said chambers, a sediment cup in communication with the inlet passage of said casing adjacent the inlet, and valve means controllable by movement of said cup and adapted to stop the flow of incoming fluid to the casing and simultaneously increase communication between said cup and said casing.

In testimony whereof I have hereunto subscribed my name at Chicago, Cook County, Illinois.

FRED A. LEIGH.